United States Patent

[11] 3,628,121

| [72] | Inventor | Kenneth Victor Diprose<br>3 Cliffe Drive, Limpley Stoke, Bath,<br>Somerset, England |
|---|---|---|
| [21] | Appl. No. | 773,763 |
| [22] | Filed | Nov. 6, 1968 |
| [45] | Patented | Dec. 14, 1971 |
| [32] | Priority | Nov. 6, 1967 |
| [33] | | Great Britain |
| [31] | | 50,423/67 |

[54] POTENTIOMETER SELF-SYNCHRONOUS MOTOR CONTROL SYSTEM
7 Claims, 1 Drawing Fig.

[52] U.S. Cl. ..................................................... 318/693, 318/663
[51] Int. Cl. ...................................................... G05b 11/12
[50] Field of Search ........................................... 318/693, 663

[56] References Cited
UNITED STATES PATENTS

| 626,009 | 5/1899 | Raverot et al. | 318/25 X |
| 2,151,793 | 3/1939 | Patin | 318/25 UX |
| 2,473,464 | 6/1949 | Alkan | 318/(20.748) |
| 2,538,415 | 1/1951 | Ergen | 318/(20.745) |
| 2,864,924 | 12/1958 | Mayer | 318/25 X |
| 3,254,283 | 5/1966 | Hunt | 318/(20.748) |

Primary Examiner—T. E. Lynch
Attorney—Marn & Jangarathis

ABSTRACT: Apparatus for transmitting angular information with improved accuracy is disclosed as applied to transmitting the heading of a gyrocompass from the compass to a remote indicator. A transmitter potentiometer is connected at three spaced contact points to three similarly spaced points on a receiver potentiometer by three lines which can constitute the sole connection between the potentiometers. A first pair of rotatable brushes, oriented in accordance with the heading, feed a given potential to the transmitter potentiometer and a second pair of rotatable brushes feed on equal potential to the receiver potentiometer. A third pair of receiver brushes, orthogonal to the second pair, are connected to a servomechanism arranged to rotate the two pairs of receiver brushes until the third pair senses zero potential, when the first and second pairs of brushes are similarly oriented with respect to the three spaced contact points of the two potentiometers.

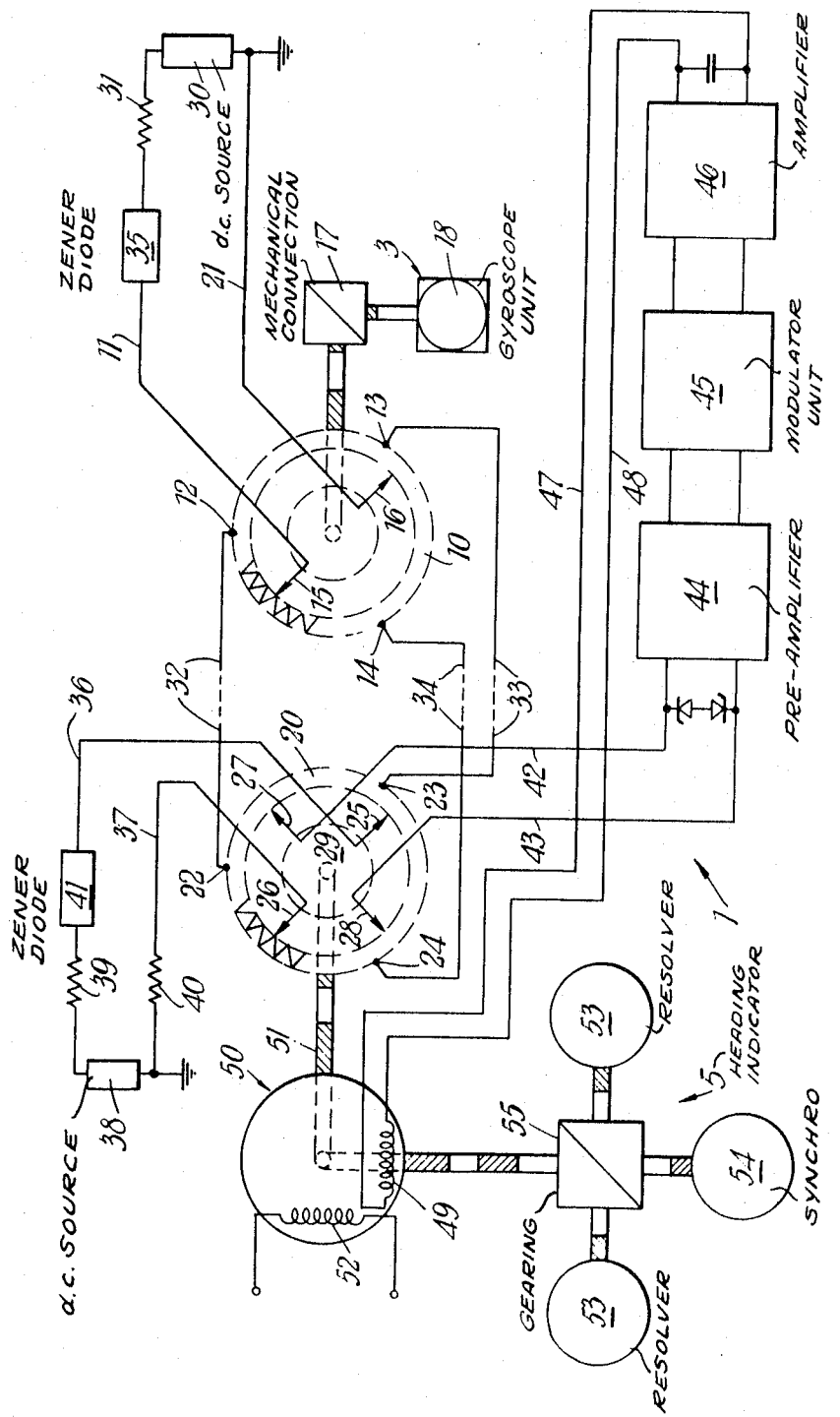

POTENTIOMETER SELF-SYNCHRONOUS MOTOR CONTROL SYSTEM

The invention relates to the electrical transmission of angular information.

Angular information, that is, information as to the angular orientation of a body, can be transmitted electrically by a synchro employing alternating current or by a direct current analogue which however, has inherent errors as described in the paper "Analysis and Design of a D-C Selsyn System" by Joseph Manildi; Electrical Engineering Transactions, July 1945, Vol. 64, pages 512–516. At least three transmission lines are required and if only three lines are used, these errors are of the order of 1° or 2° The amount of the errors can be considerably reduced by the use of more than three lines but this represents a considerable disadvantage in certain circumstances.

The present invention thus has its object the provision of an improved apparatus for the transmission of angular information electrically on three transmission lines.

The invention accordingly provides apparatus for transmitting angular information as to the position of a rotatable contact means of a transmitter potentiometer, the apparatus having three transmission lines each connecting a respective one of three angularly spaced contact positions on the transmitter potentiometer with three contact positions spaced in a like manner on a receiver potentiometer, rotatable contact means on the receiver potentiometer, the two contact means being arranged to be supplied with equal energizing voltages, and a servomechanism arranged to rotate the receiver contact means in response to the potential distribution in the receiver potentiometer to a position with respect to the receiver contact positions corresponding to the position of the transmitter contact means with respect to the transmitter contact positions.

By way of example only, an apparatus for electrically transmitting angular information in accordance with the invention is described below with reference to the accompanying drawing, which is a circuit drawing showing parts of the apparatus in schematic form.

The apparatus 1 described below is a DC system employed for the transmission of angular information from a gyrocompass unit 3 to a remotely located heading indicator device 5. Such an arrangement could be employed on a ship, for example. It will however be understood that the invention is not limited to such uses; angular information from any source can be transmitted to any suitable receiving device in accordance with the invention.

The illustrated apparatus 1 has as its transmitter and receiver, like potentiometers 10 and 20. The transmitter potentiometer 10 tapped at three points 12, 13, 14 spaced angularly by 120° and the receiver potentiometer 20 is tapped at three similarly spaced points 22, 23, 24. Three transmission lines 32, 33, 34 connect the points 12 and 22, 13 and 23, and 14 and 24 respectively.

The potentiometer 10 has a pair of diametrically opposed brushes 15, 16, the angular position of which is determined by way of a mechanical connection 17 from the azimuth gimbal 18 of the gyro unit 3.

The receiver potentiometer 20 has a first pair of brushes 25, 26 and a second pair of brushes 27, 28. The two pairs of brushes are mounted for rotation together on a rotor portion 29 of the potentiometer and the brushes of each pair are diametrically opposed on orthogonal diameters.

The transmitter brushes 15, 16 are supplied with a voltage from a DC source 30 by lines 11 and 21 respectively. The line 11 has a resistor 31 and a zener diode 35 in series and the brush 16 is earthed by means of the line 21. The receiver brushes 25, 26 are similarly supplied with a DC voltage on lines 36, 37 from a source 38 through resistors 39, 40. The line 36 has a zenister 41 in series with the resistor 39.

The second pair of receiver brushes 27, 28 is connected by lines 42, 43 through a DC preamplifier 44 to modulator unit 45. The modulator unit produces an AC output signal dependent in phase sense on the polarity of the input signal and proportional to it in amplitude. This modulator output signal is taken to an amplifier 46, the output of which is applied on lines 47, 48 to the control phase winding 49 of a servomotor 50 mechanically connected to drive the rotor portion 29 of the receiver potentiometer 20 through gearing 51. The servomotor includes a motor winding 52 and is also arranged to drive resolvers 53 and synchro 54 of the heading indicator device 5 through gearing 55 at a 1:1 ratio or other appropriate ratio to the rotation of the rotor portion 29.

For the apparatus to operate accurately, the DC excitation at the transmitter brushes 15, 16 must match that at the receiver brushes 25, 26. Where convenient, this can be achieved by use of a common DC source. If it is necessary to have separate DC sources, the currents can be regulated in any suitable manner so that the voltages between the corresponding brushes are equal. For many applications, the apparatus will work satisfactorily if energized from stabilized current sources such as are obtained as illustrated, by the use of the zener diodes 35, 41. These have the advantage of preventing excessively high currents flowing which would be the case under certain fault conditions, for example, incorrect servo follow up.

The operation of the illustrated apparatus is as follows.

The drawing shows the apparatus in a stable condition. The transmitter brushes 15, 16 in a position to which they have been moved by the gyrocompass unit 3, distribute the potential applied to them by the lines 11, 21, in a manner reproduced exactly in the receiver potentiometer 20 because the receiver brushes 25, 26, which carry the same potential from the lines 36, 37, as do the transmitter brushes, are at positions with respect to the connection points 22, 23, 24, corresponding exactly to those of the brushes 15, 16 with respect to the points 12, 13, 14, to which the points 22, 23, 24 are connected by the lines 32, 33, 34. No current flows in these lines 32, 33, 34, with the brushes 15, 16 and 25, 26 similarly aligned because the energizing voltages on the lines 11, 21 and 36, 37 are equal and no other voltage source is connected to the potentiometers. Because the receiver brushes 27, 28 are on a diameter at right angles to that occupied by the brushes 25, 26, the former pair are at zero potential difference. The preamplifier 44 receives no input and the main amplifier 46 produces no output, so that the servomotor 50 is stationary.

If now an external influence causes the gyrocompass unit 3 to indicate a new heading, the transmitter brushes 15, 16, will rotate correspondingly, changing the potential distribution in the potentiometer 10 with respect to the points 12, 13, 14. Because of the connections afforded by the lines 32, 33, 34, the potential sensed by the receiver brushes 27, 28 will no longer be zero and the resulting output of the amplifier 46 will energize the coil 49. The servomotor 50 will then rotate the rotor portion 29 and this movement will continue as long as the brushes 27, 28 sense a potential difference. Eventually however the brushes will find the one position in which the potential sensed is zero. Rotation of the brushes will then cease, with the angular orientation of the brushes 25, 26 with respect to the contact points 22, 23, 24 corresponding precisely to that of the brushes 15, 16 with respect to the points 12, 13, 14. As the heading indicator device 5 is mechanically coupled to the servomotor 50 by gearing 55, this devise will exactly reproduce the angular information provided by the gyrocompass unit 3.

An apparatus embodying the invention is entirely free of the errors inherent in the prior art and has another important advantage that the currents flowing along the three transmission lines during operation are vanishingly small, so that the apparatus is independent of the line impedance and unaffected by unequal impedances in different lines. This can be of considerable importance in transmission over long distances, or where it is impossible to use low-impedance transmission lines, for example, because of some restriction on the diameter of the conductors.

The invention thus provides a simple and convenient apparatus for transmitting angular information over only three transmission lines. The invention can be embodied in a variety of ways besides those specifically described within the scope thereof which is defined in the following claims.

I claim:

1. Apparatus for transmitting angular information comprising a transmitter potentiometer, a first pair of contacts diametrically opposed across and rotatable on the transmitter potentiometer, a first set of three contacts equally spaced at fixed positions around the transmitter potentiometer, a receiver potentiometer, a second pair of contacts diametrically opposed across and rotatable on the receiver potentiometer, a second set of three contacts equally spaced at fixed positions around the receiver potentiometer, three connection means each connecting one of said first set of contacts with a respective one of said second set of contacts, supply means supplying equal DC energizing voltages to said first and second pairs of contacts, means effecting an angular orientation of said first pair of contacts relative to said first set of contacts corresponding to the angular information to be transmitted, means sensitive to the voltage distribution in said receiver potentiometer comprising a third pair of diametrically opposed contacts orthogonal to and rotatable with said second pair of contacts, drive means for changing the angular orientation of the second pair of contacts relative to said second set of contacts, and a power source for said drive means, said drive means being responsive to the sensed voltage distribution to effect angular orientation of said pair of contacts relative to said second set of contacts corresponding to said angular orientation of said first pair of contacts relative to said first set of contacts.

2. Apparatus as claimed in claim 1 having a pair of stabilized DC sources each supplying a respective one of the energizing voltages.

3. Apparatus for transmitting angular information comprising a transmitter potentiometer having a first pair of diametrically opposed contacts rotatable on said potentiometer, a receiver potentiometer having second and third orthogonal pairs of diametrically opposed contacts rotatable together thereon supply means for supplying equal DC energizing voltages to said first and second pairs of contacts, three transmission wires each connecting a respective one of a set of three contact positions angularly spaced around the transmitter potentiometer with a corresponding contact position of a set of three contact positions angularly spaced around the receiver potentiometer in a like manner to the spacing of the first set of contacts around the transmitter potentiometer, means responsive to the potential sensed by the third pair of contacts for producing an AC output dependent in phase on the polarity of the sensed potential and proportional to the potential in amplitude, and a servomechanism comprising a servomotor having a control phase winding to which the AC output is applied to rotate said second and third pairs of contacts to a position in which said sensed voltage is zero.

4. Apparatus as claimed in claim 3 having amplifying means for amplifying any potential sensed by the third pair of contacts.

5. Apparatus as claimed in claim 3 having a gyrocompass unit connected to rotate said first pair of contacts and a heading indicator device connected to be driven by the second and third pairs of contacts.

6. Apparatus as claimed in claim 3 having a pair of DC sources each supplying a respective one of the energizing voltages.

7. Apparatus as claimed in claim 6 in which each DC source includes a Zener diode.

* * * * *

UNITED STATES PATENT OFFICE
CERTIFICATE OF CORRECTION

Patent No. 3,628,121          Dated December 14, 1971

Inventor(s)  KENNETH VICTOR DIPROSE

It is certified that error appears in the above-identified patent and that said Letters Patent are hereby corrected as shown below:

Assignment of this patent is to:

S. G. Brown, Ltd.
    Shakespeare Street
    Watford, Hertfordshire, ENGLAND

Signed and sealed this 5th day of December 1972.

(SEAL)
Attest:

EDWARD M. FLETCHER, JR.    ROBERT GOTTSCHALK
Attesting Officer      Commissioner of Patents